United States Patent
Crawford et al.

(10) Patent No.: US 10,352,214 B2
(45) Date of Patent: *Jul. 16, 2019

(54) GASEOUS EMISSIONS TREATMENT STRUCTURES WITH INDUCTION HEATING

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto, Ontario (CA)

( * ) Notice: Subject to any disclaimer, the term of this patent is extended or adjusted under 35 U.S.C. 154(b) by 106 days.

This patent is subject to a terminal disclaimer.

(21) Appl. No.: 15/259,858

(22) Filed: Sep. 8, 2016

(65) Prior Publication Data

US 2016/0376966 A1    Dec. 29, 2016

Related U.S. Application Data

(63) Continuation of application No. 14/452,800, filed on Aug. 6, 2014, now Pat. No. 9,488,085.

(60) Provisional application No. 61/910,067, filed on Nov. 28, 2013, provisional application No. 61/879,211, filed on Sep. 18, 2013.

(51) Int. Cl.
| | |
|---|---|
| *F01N 3/10* | (2006.01) |
| *F01N 3/20* | (2006.01) |
| *F01N 3/28* | (2006.01) |
| *F01N 9/00* | (2006.01) |
| *H05B 6/10* | (2006.01) |

(52) U.S. Cl.
CPC ........ *F01N 3/2026* (2013.01); *F01N 3/2013* (2013.01); *F01N 3/2828* (2013.01); *F01N 3/2835* (2013.01); *F01N 9/00* (2013.01); *H05B 6/108* (2013.01); *F01N 2240/05* (2013.01); *F01N 2330/06* (2013.01); *F01N 2510/00* (2013.01); *F01N 2900/0602* (2013.01); *Y02T 10/26* (2013.01)

(58) Field of Classification Search
CPC .......... F01N 3/0892; F01N 3/01; F01N 13/02; F01N 2240/28; F02B 3/06
See application file for complete search history.

(56) References Cited

U.S. PATENT DOCUMENTS

| | | | | |
|---|---|---|---|---|
| 3,581,489 A | * | 6/1971 | Camin | ..................... B01J 8/067 |
| | | | | 422/177 |
| 3,785,778 A | * | 1/1974 | Burstein | ................ B01D 53/34 |
| | | | | 126/299 R |

(Continued)

FOREIGN PATENT DOCUMENTS

| | | |
|---|---|---|
| DE | 4341380 A1 | 6/1995 |
| EP | 0574012 A2 | 12/1993 |

(Continued)

*Primary Examiner* — Patrick D Maines
(74) *Attorney, Agent, or Firm* — Stuart L. Wilkinson (57) ABSTRACT

A gaseous emissions treatment assembly has a honeycomb ceramic substrate body with a plurality of cells for passage of exhaust gases. Respective lengths of metal wire are located in a number of the cells. An induction heating coil is mounted adjacent the substrate body for generating a varying electromagnetic field, thereby inductively to heat the lengths of wire and thereby to heat the substrate body.

16 Claims, 10 Drawing Sheets

(56) References Cited

U.S. PATENT DOCUMENTS

| | | | |
|---|---|---|---|
| 5,180,559 A | 1/1993 | Ma | |
| 5,540,886 A | 7/1996 | Warmbier et al. | |
| 5,569,441 A | 10/1996 | Engler et al. | |
| 5,569,455 A | 10/1996 | Fukui et al. | |
| 6,029,442 A | 2/2000 | Caren et al. | |
| 6,692,634 B1 | 2/2004 | Yakovlevich et al. | |
| 9,488,085 B2 * | 11/2016 | Crawford | F01N 3/2026 |

FOREIGN PATENT DOCUMENTS

| | | | |
|---|---|---|---|
| GB | 2231813 A | 11/1990 | |
| JP | 08028250 A | 1/1996 | |
| JP | 08326522 A | 12/1996 | |
| JP | 11336534 A | 12/1999 | |
| JP | 02010024910 A | 2/2010 | |
| JP | 2012067610 A | 4/2012 | |
| WO | 94/01202 A1 | 1/1994 | |
| WO | 2011127095 A2 | 10/2011 | |
| WO | 2012100273 A1 | 8/2012 | |

* cited by examiner

FIG. 18

GASEOUS EMISSIONS TREATMENT STRUCTURES WITH INDUCTION HEATING

CROSS REFERENCE TO RELATED PATENTS

The present application a continuation of U.S. patent application Ser. No. 14/452,800 entitled "Catalytic converter structures with induction heating" filed Aug. 6, 2014 which claims priority pursuant to 35 U.S.C. § 119(e) from U.S. Provisional Application Ser. No. 61/879,211 entitled "Catalytic converter employing electrohydrodynamic technology" filed Sep. 18, 2013, and from U.S. Provisional Application Ser. No. 61/910,067 entitled "Catalytic converter employing electrohydrodynamic technology" filed Nov. 28, 2013, the disclosure of which applications are hereby incorporated herein by reference in their entirety and made part of the present application for all purposes.

FIELD OF THE INVENTION

This invention relates to a structures and methods of operation of assemblies for treating exhaust gases to reduce harmful pollution and has particular but not exclusive application to reducing pollution from internal combustion engines at start-up and when idling.

BACKGROUND

The U.S. Department of Transportation (DOT) and the U.S. Environmental Protection Agency (EPA) have established U.S. federal rules that set national greenhouse gas emission standards. Beginning with 2012 model year vehicles, automobile manufacturers required that fleet-wide greenhouse gas emissions be reduced by approximately five percent every year. Included in the requirements, for example, the new standards decreed that new passenger cars, light-duty trucks, and medium-duty passenger vehicles had to have an estimated combined average emissions level no greater than 250 grams of carbon dioxide ($CO_2$) per mile in vehicle model year 2016.

Catalytic converters are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

Catalytic converters have low efficiency when cold, i.e. the running temperature from ambient air start-up temperature to a temperature of the order of 300 C or "light-off" temperature, being the temperature where the metal catalyst starts to accelerate the pollutant conversion processes previously described. Below light-off temperature, little to no catalytic action takes place. This is therefore the period during a vehicle's daily use during which most of the vehicle's polluting emissions are produced. Getting the catalytic converter hot as quickly as possible is important to reducing cold start emissions.

BRIEF DESCRIPTION OF THE DRAWING

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
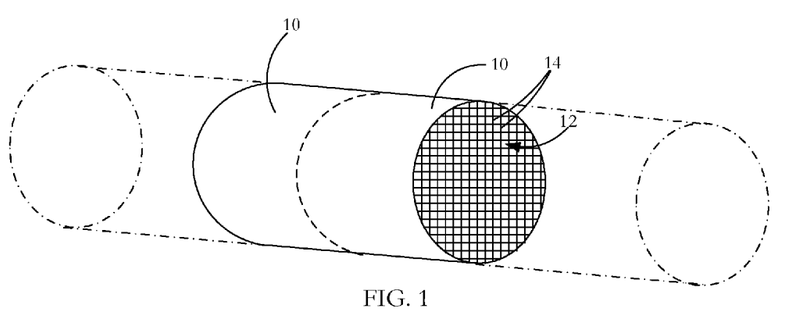
FIG. 1 is a perspective outline view of a catalytic converter brick being formed in an extrusion process.

A gaseous emissions treatment assembly may take any of a number of forms. Typical of these is a catalytic converter having a cylindrical substrate of ceramic material, generally called a brick, an example of which is shown in FIG. 1. The brick 10 has a honeycomb structure in which a number of small area passages or cells 12 extend the length of the brick, the passages being separated by walls 14. There are typically from 400 to 900 cells per square inch of cross-sectional area of the substrate unit and the walls are typically in the range 0.006 to 0.008 inches in thickness. As indicated in FIG. 1, the ceramic substrates are formed in an extrusion process in which green ceramic material is extruded through an appropriately shaped die and units are cut successively from the extrusion, the units being then cut into bricks which are shorter than a unit. The areal shape of the passages 12 may be whatever is convenient for contributing to the overall strength of the brick while presenting a large contact area at which flowing exhaust gases can interact with a hot catalyst coating the interior cell walls.

The interiors of the tubular passages in the bricks are wash-coated with a layer containing the particular catalyst material. A suitable wash-coat contains a base material, suitable for ensuring adherence to the cured ceramic material of the substrate, and entrained catalyst material for promoting specific pollution-reducing chemical reactions. Examples of such catalyst materials are platinum and palladium which are catalysts effective in converting carbon monoxide and oxygen to carbon dioxide, and rhodium which is a catalyst suitable for converting nitric oxide to nitrogen and oxygen. Other catalysts are known which promote high temperature oxidation or reduction of other gaseous materials. The wash-coating is prepared by generating a suspension of the finely divided catalyst in a ceramic paste or slurry, the ceramic slurry serving to cause the wash-coat layer to adhere to the walls of the ceramic substrate. As an alternative to wash-coating to place catalyst materials on the substrate surfaces, the substrate material itself may contain a catalyst assembly so that the extrusion presents catalyst material at the internal surfaces bounding the substrate passages or cells.

A gaseous emissions treatment assembly may have a series of such bricks, each having a different catalyst layer depending on the particular noxious emission to be neutralized. Catalytic converter bricks may be made of materials other than fired ceramic, such as stainless steel. Also, they may have different forms of honeycombed passages than those described above. For example, substrate cells can be round, square, hexagonal, triangular or other convenient section. In addition, if desired for optimizing strength and low thermal capacity or for other purposes, some of the extruded honeycomb walls can be formed so as to be thicker than other of the walls, or formed so that there is some variety in the shape and size of honeycomb cells. Junctions between adjacent interior cell walls can be sharp angled or can present curved profiles.

Figure 2:
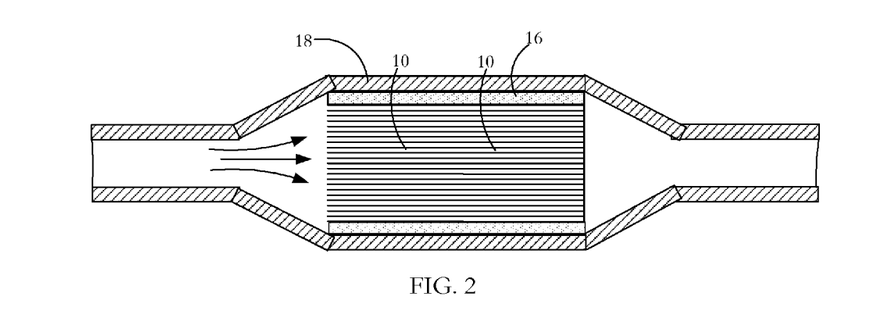
FIG. 2 is a longitudinal sectional view of a known form of gaseous emissions treatment assembly.

Typically, as shown in FIG. 2, the wash-coated ceramic honeycomb brick 10 is wrapped in a ceramic fibrous expansion blanket 16. A stamped metal casing or can 18 transitions between the parts of the exhaust pipe fore and aft of the catalytic converter so as to encompass the blanket wrapped brick. The casing 18 is typically made up of two parts which are welded to seal the brick in place. The expansion blanket provides a buffer between the casing and the brick to accommodate their dissimilar thermal expansion coefficients. The sheet metal casing expands many times more than the ceramic at a given temperature increase and if the two materials were bonded together or in direct contact with each other, destructive stresses would be experienced at the interface of the two materials. The blanket also dampens vibrations from the exhaust system that might otherwise damage the brittle ceramic.

In use, the encased bricks are mounted in the vehicle exhaust line to receive exhaust gases from the engine and to pass them to the vehicle tail pipe. The passage of exhaust gases through the catalytic converter heats the brick to promote catalyst activated processes where the flowing gases contact the catalyst layer. Especially when the vehicle engine is being run at optimal operating temperature and when there is substantial throughput of exhaust gases, such converters operate substantially to reduce the presence of noxious gaseous emissions entering the atmosphere. Such converters have shortcomings however at start-up when the interior of the brick is not at high temperature and during idling which may occur frequently during city driving or when waiting for a coffee at a Tim Hortons drive-through.

Converter shape, profile and cell densities vary among different manufacturers. For example, some converter bricks are round and some are oval. Some converter assemblies have single stage bricks that are generally heavily wash-coated with the catalyst metals, while others may have two or three converter bricks with different wash-coatings on each brick. Some exhausts have 900, 600 and 400 cell per square inch (cpsi) cell densities used in the full exhaust assembly, while others use only 400 cpsi bricks throughout. A close-coupled converter may be mounted up close to the exhaust manifold with a view to reducing the period between start-up and light-off. An underfloor converter can be located further from the engine where it will take relatively longer to heat up but be relatively larger and used to treat the majority of gases once the exhaust assembly is up to temperature. In another configuration, a unit for reducing the period to light-off and a unit to deal with high gas flow after light-off are mounted together in a common casing.

At one or more locations in the converter assembly, sensors are mounted in the exhaust gas flow to provide feedback to the engine control system for emission checking and tuning purposes. Aside from start-up, control of fuel and air input has the object typically of maintaining a 14.6:1 air:fuel ratio for an optimal combination of power and cleanliness. A ratio higher than this produces a lean condition—not enough fuel. A lower ratio produces a rich condition—too much fuel. The start-up procedure on some vehicles runs rich for an initial few seconds to get heat into the engine and ultimately the catalytic converter. The structures and operating methods described below for indirectly heating the catalyst layers and the exhaust gases can be used with each of a close-coupled catalytic converter, an underfloor converter, and a combination of the two.

Figure 3:
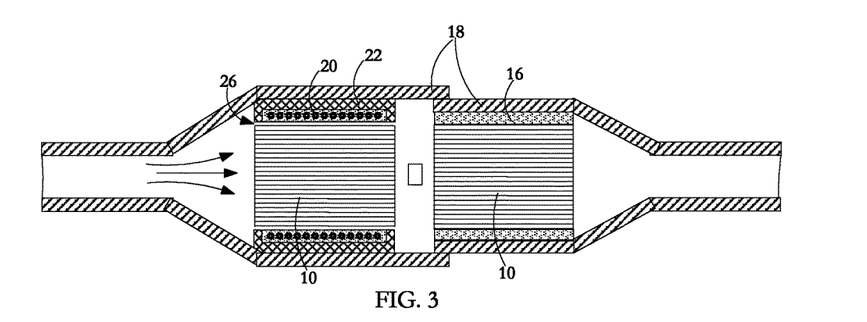
FIG. 3 is a longitudinal sectional view of a catalytic converter assembly according to an embodiment of the invention.

FIG. 3 shows an assembly having two bricks of the sort illustrated in FIGS. 1 and 2, but in which one brick is modified to enable induction heating. Induction heating is a process in which a metal body is heated by applying a varying electromagnetic field so as to change the magnetic field to which the metal body is subject. This, in turn, induces eddy currents within the body, thereby causing resistive heating of the body. In the case of a ferrous metal body, heat is also generated by a hysteresis effect. When the non-magnetized ferrous metal is placed into a magnetic field, the metal becomes magnetized with the creation of magnetic domains having opposite poles. The varying field periodically initiates pole reversal in the magnetic domains, the reversals in response to high frequency induction field variation on the order of 1,000 s to 1,000,000 s cycles per second (Hz) depending on the material, mass, and shape of the ferrous metal body. Magnetic domain polarity is not easily reversed and the resistance to reversal causes further heat generation in the metal.

As illustrated in FIG. 3, surrounding the ceramic substrate is a metal coil 20 and, although not shown in the figure, located at selected positions within the ceramic substrate 10 are metal elements which may take any of a number of forms. By generating a varying electromagnetic field at the coil 20, a chain reaction is initiated, the end result of which is that after start-up of a vehicle equipped with an exhaust system embodying the invention, light-off may be attained more quickly in the presence of the varying electromagnetic induction field than if there were no such field. The chain reaction is as follows: the varying electromagnetic field induces eddy currents in the metal elements; the eddy currents cause heating of the metal elements; heat from the metal elements is transferred to the ceramic substrate 10; heat from the heated substrate is transferred to exhaust gas as it passes through the converter; and the heated exhaust gas causes the catalytic reactions to take place more quickly compared to unheated exhaust gas.

The coil 20 is a wound length of copper tube, although other materials such as copper or litz wire may be used. Copper tube is preferred because it offers high surface area in terms of other dimensions of the coil; induction being a skin-effect phenomenon, high surface area is of advantage in generating the varying field. If litz wire or copper wire is used, an enamel or other coating on the wire is configured not to burn off during sustained high temperature operation of the converter.

A layer of 22 of electromagnetic field shielding material such as ferrite is located immediately outside the coil 20 to provide an induction shielding layer and reduces induction loss to the metal converter housing 18. The ferrite 22 also acts to increase inductive coupling to the ceramic substrate 10 to focus heating.

The coil is encased in cast and cured insulation 24. The cast insulation functions both to stabilize the coil position and to create an air-tight seal to confine passage of the exhaust gases through the ceramic honeycomb substrate 10 where the catalytic action takes place. The insulation 24 also provides a barrier to prevent the induction coil 20 from shorting on the converter can 18 or the ferrite shield 22. The insulation is suitable alumino-silicate mastic. In an alternative embodiment, the converter is wrapped in an aluminosilicate fibre paper. In one manufacturing method, the copper coil 20 is wrapped around the ceramic substrate 10 and then placed in the converter casing or can 18. In an alternative manufacturing method, the coil 20 is placed in the can 18 and the ceramic substrate 10 is inserted into the coil can assembly.

In one embodiment of the invention, a varying electromagnetic induction field is generated at the coil by applying power from either a DC or AC source. Conventional automobiles have 12 VDC electrical systems. The induction system can operate on either DC or AC power supply. The induction signal produced can also be either DC or AC driven. For either DC or AC, this produces a frequency of 1 to 200 kHz, a RMS voltage 130 to 200V and amperage of 5 to 8 A using 1 kw of power as an example. In one example suitable for road vehicles, a DC to DC bus converts the vehicle's 12 VDC battery power to the required DC voltage outlined above. In another example suitable for conventional road vehicles, a DC to AC inverter converts the vehicle's 12V DC battery power to the desired AC voltage outlined above. Another example is more suited to hybrid vehicles having both internal combustion engines and electric motors have on-board batteries rated in the order of 360V voltage and 50 kW power. In this case, the battery supply power is higher, but the same basic DC to DC bus or DC to AC inverter electrical configuration can be applied. An IGBT high speed switch is used to change the direction of electrical flow through the coil. In terms of the effect of a varying electromagnetic induction field on metal in the ceramic substrate, a low switching frequency produces a longer waveform providing good field penetration below the surface of the metal element and therefore relatively uniform heating. However, this is at the sacrifice of high temperature and rapid heating owing to the lack of switching. In contrast, a high switching frequency produces a shorter waveform, which generates higher surface temperature at the sacrifice of penetration depth. Applied power is limited to avoid the risk of melting the metal elements. A suitable power input to a single brick coil is of the order of 1.1 kw.

As previously described, metal elements are located at selected locations of the ceramic substrate 10. For two identical metal elements, generally, a metal element closer to the source of the induction field becomes hotter than an equivalent metal element located further away from the source because there is an increase in efficiency; i.e. the level of induction achieved for a given power input. With a regular induction coil 20 as illustrated, metal elements at the outside of the cylindrical substrate 10 are near to the coil 20 and become very hot, while an equivalent metal element near the substrate center remains relatively cool. An air gap 26 between the coil 20 and the nearest inductance metal elements prevents significant heat transfer from the inductance metal elements to the coil which would otherwise increase the coil resistivity and so lower its efficiency. In an alternative embodiment, a relatively higher concentration of the metal elements is sited towards the center of the ceramic substrate to compensate for the fact that the field effect from the coil source is considerably less near the center of the substrate than near the outer part of the substrate. In a further embodiment, a relatively higher metal element load is located at some intermediate position between the center and perimeter of the ceramic substrate, whereby heat generated within the intermediate layer flows both inwardly to the center and outwardly to the perimeter for more efficient overall heating. The induction coil 20 is sized to the metal load to achieve high efficiency in terms of generating heat and in terms of speed to light-off.

Figure 4:
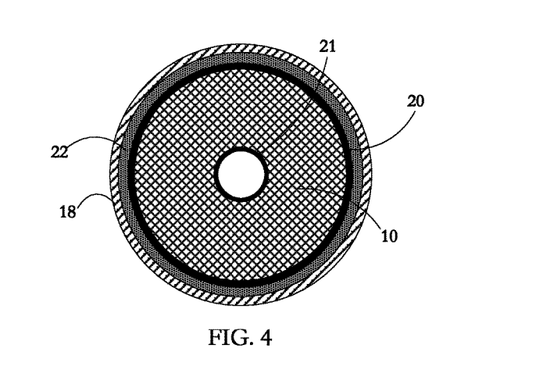
FIG. 4 is a cross-sectional view of a catalytic converter according to another embodiment of the invention.

The electromagnetic induction field can be tuned to modify heating effects by appropriate selection of any or all of (a) the electrical input waveform to the coil, (b) nature and position of passive flux control elements, and (c) nature, position, and configuration of the coil 20. For example, the induction field is tuned to the location of metal elements or to the location of high concentration of such elements in the ceramic substrate 10. Alternatively, or in addition, the applied field is changed with time so that there is interdependence between the induction field pattern and the particular operational phase from pre-start-up to highway driving. In an alternative configuration, more than one coil can be used to obtain desired induction effects. For example, as shown in the cross sectional view of FIG. 4, the ceramic substrate 10 has an annular cross-section with a first energizing coil 20 at the substrate perimeter and a second energizing coil 21 at the substrate core.

Figure 5:
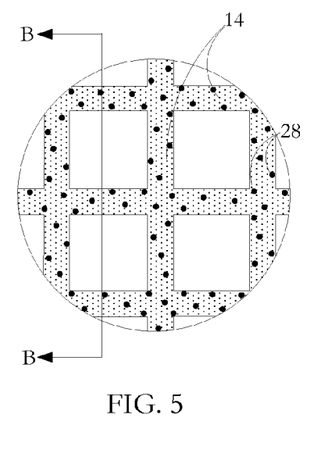
FIG. 5 is a cross-sectional view of a fragment of a catalytic converter substrate according to an embodiment of the invention.
Figure 6:
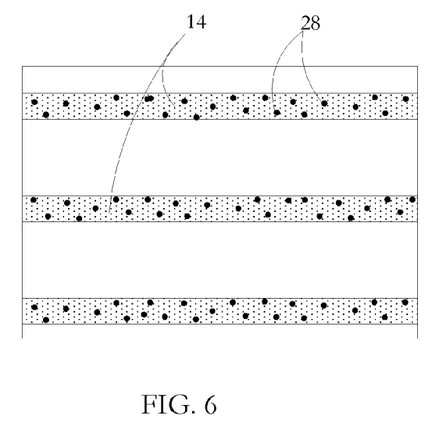
FIG. 6 is a longitudinal sectional view of the substrate fragment illustrated in FIG. 5 taken on the line B-B of FIG. 5.

As shown in the fragmentary sectional views of FIGS. 5 and 6, in one embodiment of the invention, the metal elements are metal particles 28 which are embedded in the walls 14 of the ceramic honeycomb substrate, the particle size being less than the width of walls 14. As part of the manufacturing process, the metal particles are added and mixed with a ceramic base material while the ceramic is still green or flowable; i.e. before it is extruded. In this way, the particles are distributed relatively evenly throughout the ceramic base material to be extruded. In operation of this embodiment, when a varying electromagnetic induction field is applied from the coil 20, the ceramic material in the substrate is comparatively invisible to the applied field and therefore does not heat up. The metal particles 28 heat up and conduct heat to the walls 14 of the ceramic honeycomb within which they are bound.

In an alternative manufacturing embodiment, mixing of the ceramic base material with metal particles and subsequent extrusion of the mixture to form the honeycomb substrate are configured so that selected locations in the substrate have a greater metal particle concentration than other locations. Such a configuration may be attained by bringing together at the extruder several streams of green ceramic material, with the streams having different levels of metal content from one another. The streams are then fused immediately before extrusion so that the variation in metal content is mirrored across the cross-section of the extruded substrate. In a further embodiment, metal particles are used that are elongate or otherwise asymmetric so that they tend to align somewhat closer to converter cell walls in the course of the extrusion process. In another embodiment, the particle lengths are made sufficiently long that at least some adjacent particles come into electrical contact with each other in the course of mixing or subsequent extrusion.

Figure 7:
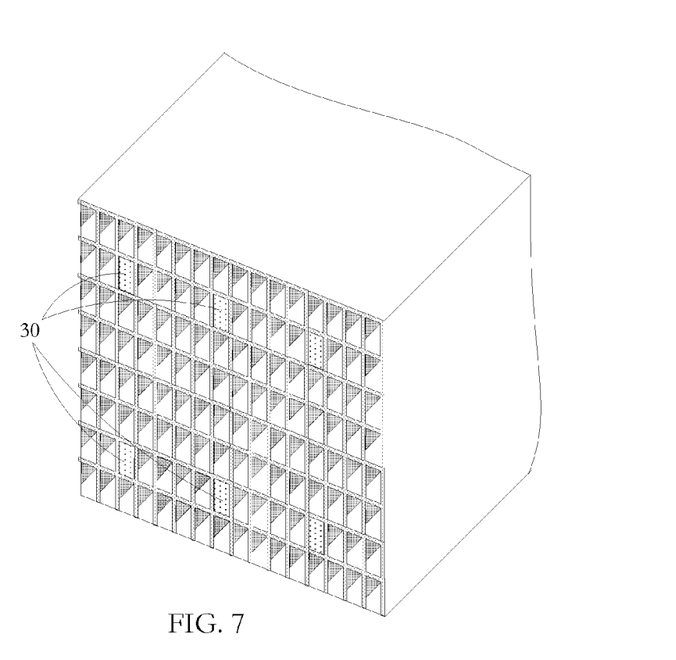
FIG. 7 is a perspective end view of a larger fragment corresponding to the small substrate fragment shown in FIGS. 5 and 6.

In alternative embodiments of the invention, the metal elements are located within the ceramic honeycomb structure, but not embedded within the material of the honeycomb structure itself. For example, during post-processing of ceramic substrate bricks, metal elements are positioned in selected cells 12 of the substrate 10. In one implementation as illustrated in FIG. 7, a high concentration of metal particles is mixed with a mastic and the resulting mixture is injected using a method such as that described in copending utility patent application 13971129 (A catalytic converter assembly and process for its manufacture), filed Aug. 20, 2013, the disclosure of which application is incorporated herein by reference in its entirety and made part of the present application for all purposes. Following injection, injected threads 30 of the mastic mixture are cured by, for example, microwave heating as described in copending utility patent application 13971247 (A catalytic converter assembly and process for its manufacture) filed Aug. 20, 2013, the disclosure of which application is also incorporated herein by reference in its entirety and made part of the present application for all purposes. In one implementation, the mastic base material is a low viscosity, paste-like mixture of glass fibers, clay slurry, polymer binder and water, from which the water and the organic binder are driven off in the course of the curing process. Following curing, the injected threads 30 are predominantly silica in a porous matrix of silica, ceramic and metal particles.

In another exemplary configuration (not shown), selection of passages 12 to be injected is made so that the threads of cured mastic metal mixture are not uniformly distributed, but generally occupy an intermediate annular zone of the cylindrical substrate. In the operation of such a structure, heat is preferentially generated at the annular zone and is transferred from the zone sites inwardly towards the substrate core and outwardly towards its perimeter. It is preferred that metal particles within the mastic metal mixture injected into a cell are predominantly situated close to the cell interior surface rather than towards the cell center so as to localize heat generation near the cell surfaces and to get greater heat transfer and speed of such transfer to the ceramic substrate. Appropriately directed agitation of the loaded converter brick after during and/or after extrusion and before curing can encourage some migration of metal particles towards the cell walls.

In injected cell implementations, any cell which is blocked with a thread of the mastic and metal particles cannot function to catalyze a pollution-reducing reaction as exhaust gas passes through the cell. Such a plugged cell is used solely for heating at start-up or when idling. Consequently, only selected ones of the cells are filled with the composite heating material. In the example illustrated, the substrate has 400 cells per square inch. Of these, from 8 to 40 cells per square inch are filled with the metal mastic composite depending on the radial position of the cells and such that over the full areal extent of the substrate, the blocked cells occupy from 2 to 10% of the substrate area.

Figure 8:
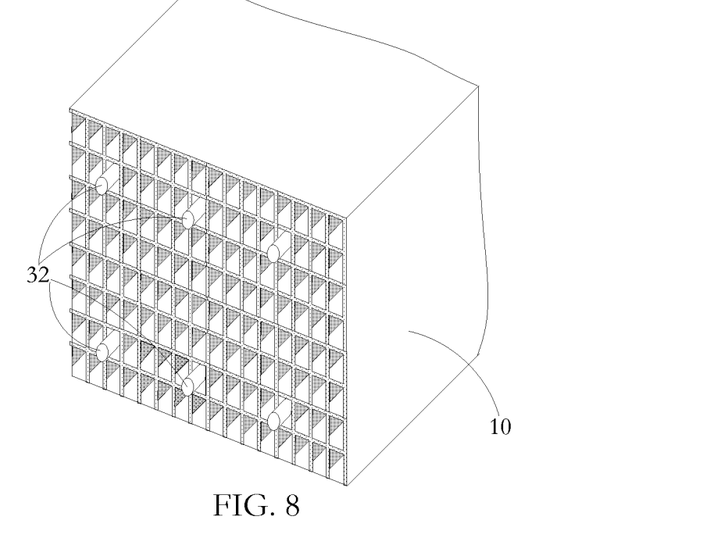
FIG. 8 is a perspective end view similar to FIG. 7 but showing a catalytic converter substrate according to another embodiment of the invention.

In a further embodiment of the invention, discrete metal elements that are larger than the particle sizes discussed with the FIG. 7 embodiment are inserted at selected cell locations in the catalytic converter substrate. As shown in FIG. 8, exemplary metal elements are wires 32 which are positioned within selected substrate cells and which extend along the full length of the cells from the brick entrance to its exit. The inserted wires 32 may, for example, be of round, square or other suitable cross-section. As shown in the FIG. 8 embodiment, the ceramic converter substrate 10 has square cells and round section wires. Square section wires provide better heat transfer to the square section cells due to high contact area between the two materials. However, round section wires are easier to insert into the square section cells owing to there being less surface area contact causing insertion resistance. The wires may be fixed into their respective cells by a friction fit which is at least partially achieved by closely matching the wire exterior area dimensions to the cell area dimensions so that surface roughness of the wire surface and the cell walls locks the wires in place. Wire is drawn to be from 0.002 inches to 0.005 inches less in width than the cell width to enable insertion.

Figure 9:
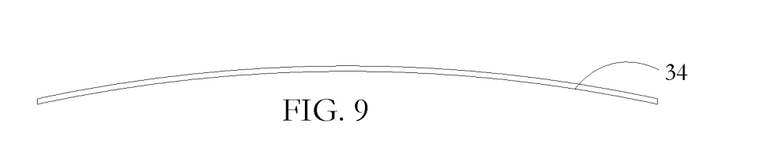
FIG. 9 is a longitudinal sectional view of part of the substrate FIG. 8 including a wire insert.
Figure 10:
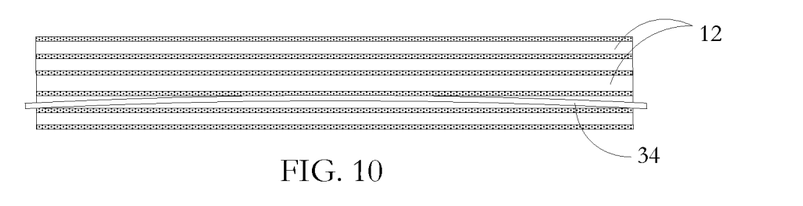
FIG. 10 is a longitudinal sectional view of a fragment of a catalytic converter substrate showing the wire insert of FIG. 9 inserted into the substrate.
Figure 11:
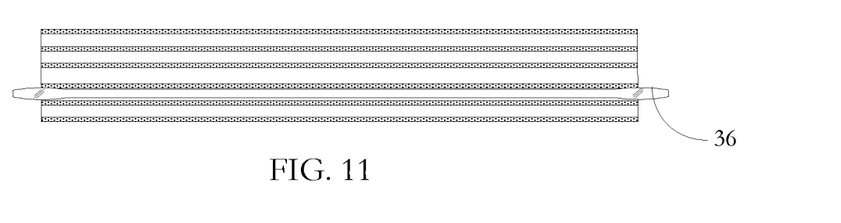
FIG. 11 is a longitudinal sectional view of a fragment of a catalytic converter substrate showing an inserted wire insert according to another embodiment of the invention.

In one configuration, a wire insert 34 is formed to have a bow-shape as shown in FIGS. 9 and 10. The bowed wire 34 has memory so that after the bow is straightened as the wire is inserted into a cell 12, the insert 34 tends to return to its bow shape causing center and end regions of the wire to bear against opposed sides or corners of the cell 12 and so enhance the friction fit to retain the wire in place in the cell. Alternatively, or in addition, wires 36 are crimped at their ends as shown in the embodiment of FIG. 11 so as to establish end bearing contact sites. The overall friction fit in each case is such as to resist gravity, vibration, temperature cycling, and pressure on the wires as exhaust gases pass through the converter.

Figure 8A:
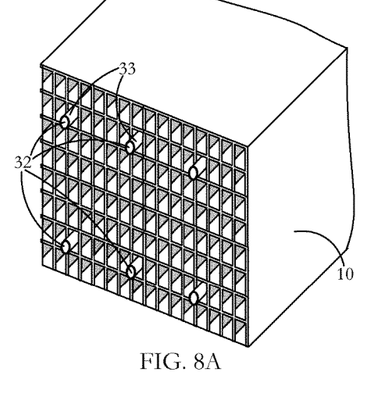
FIG. 8A is a perspective end view similar to FIG. 7 but showing part of a catalytic converter substrate according to a further embodiment of the invention.
Figure 8B:
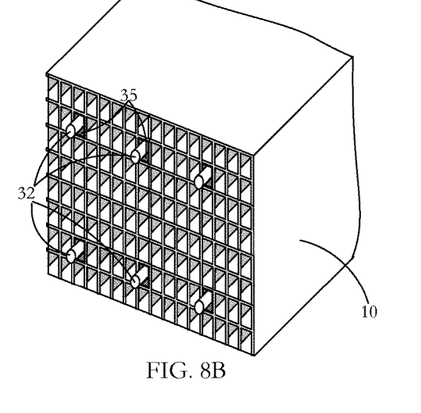
FIG. 8B is a perspective end view similar to FIG. 7 but showing part of a catalytic converter substrate according to yet another embodiment of the invention.
Figure 8C:
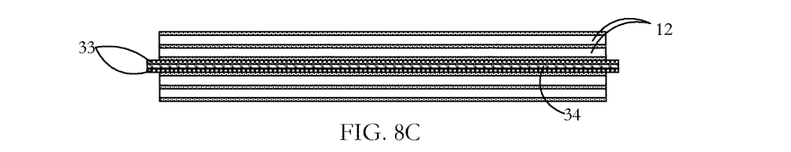
FIG. 8C is a longitudinal sectional view of part of the substrate FIG. 8A including a wire insert.
Figure 8D:
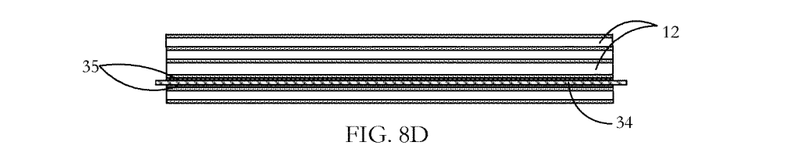
FIG. 8D is a longitudinal sectional view of part of the substrate FIG. 8B including a wire insert.

Wires may alternatively, or in addition, be fixed into the cells by bonding outer surfaces of the wires to interior surfaces of respective cells. In exemplary bonding processes, the wire is at least partially coated with a coating 33 of an adhesive/mastic before wire insertion (FIGS. 8A 8C), or a small amount of adhesive/mastic is applied as a coating 35 onto the cell interior walls before wire insertion (FIGS. 8B, 8D). High temperature mastic materials and composite adhesives are used. Suitable mastic, for example, is of the same form as that used in the injection embodiments previously described. A composite adhesive, for example, is a blend of ceramic and metal powders with a binder transitioning between the two main materials. Such a blend is used to minimize temperature cycling stress effects in which there may be significant metal wire expansion/contraction, but vanishingly small expansion/contraction of the ceramic substrate. This differential can produce stresses at the adhesive interface between the two materials. By using such a composite adhesive, movement of a bonded wire relative to the surrounding cell surface is minimized and heat transfer increased heat transfer is obtained by the presence of the composite adhesive material.

As shown in the embodiment of FIG. 8, an array of wires having a uniform distribution through the array of converter cells is used. In one example, 1 wire is inserted for every 25 cells of a 400 cpsi substrate. This has a satisfactory heating performance and not too great an occlusion of converter cells from the viewpoint of pollution-cleaning catalytic reactions implemented at the converter. A significantly higher ratio of wires to cells can result in slower heating to light-off because of the high overall thermal capacity represented, in total, by the wires and because of the fact that some wires block the "line of sight" field effect on other wires. In contrast, while a significantly lower ratio of wires to cells results in fewer occlusions of converter cells, a sparse distribution of metal of the order of less than 1 wire inserted for every 49 cells in a 400 cpsi substrate results in reduced heat generation and increased time to light-off. As in the case of the injected metal particle embodiments described previously, wires can be inserted in a non-uniform pattern: for example, to a generally annular concentration of wire insertions at an intermediate radial position within the ceramic converter substrate; or to position a greater concentration of wires near the core of the converter furthest from the coil compared to the concentration of wires near the perimeter of the converter.

There are advantages and disadvantages as between using metal particles and larger metal elements such as wire inserts. Induction heating produces a "skin-effect" hot surface of the metal being heated. This makes the surface area of the metal element important to efficient heating. Generally, the more surface area there is, the quicker the metal heats-up. However, induction is a line-of-sight process where the surface that "sees" the inductive field is the one that heats-up first and gets hotter. Powder particles heat-up quickly and larger bodies heat-up more slowly. In the case of particles, whether dispersed and embedded in the ceramic substrate material itself or in mastic injected into selected cells, each particle acts independently of the next so there is little conduction between neighbouring particles. Consequently, heat distribution may be relatively poor. Larger metal bodies conduct heat well throughout their bulk and so are preferred in terms of distributing heat. The thin wire embodiments of FIG. 8 offer a good compromise between particles and solid bodies in terms of surface area, line-of-sight positioning and conduction characteristics all of which significantly affect the heating performance.

Conduction is the primary source of heat transfer to the ceramic substrate and therefore to the exhaust gases when the converter is in operation. In the case of the wire insert embodiments, there is also a small amount of convective heat transfer but this is limited as there is only a small air gap between the wires and the interior surface of the cells so air movement is minimized. There is also a relatively small amount of radiation heat transfer in the case such as inserted wires where the wires are separated over a large part of their surface area from the interior of the cells but where the separation is not occluded.

As previously described and illustrated, a preferred distribution of inductance metal elements relative to the position of cells is configured so that the heating effect is generally uniform across the area of the converter. Especially for start-up and idling, where non-uniform exhaust gas flow patterns may develop, there may be advantage in deliberately developing a heat pattern across the converter which is not uniform. As previously noted, this may be achieved by appropriately siting inductance metal elements in selected cells. It may also be achieved in another embodiment of the invention by using differently sized or shaped metal inserts or by using different concentrations of particles in the injection embodiments. It may be achieved in a further alternative structure and method by generating a non-radially symmetrical field or generating two or more interfering fields. Such induction fields and their interaction could, for example, be varied in the period from start-up to light-off. Changing heating effects may also be achieved using a combination of such inductance metal siting and field manipulation. Targeted heating that varies in position, time, or both can be implemented with a view to increasing conversion of pollutants, to saving power, or for other reasons.

Figure 12:
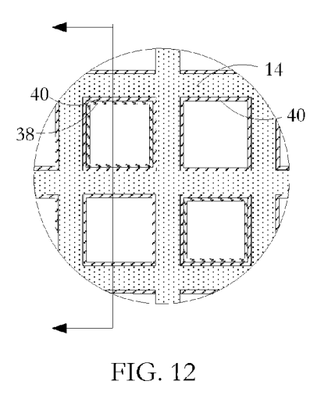
FIG. 12 is a cross-sectional view of a fragment of a catalytic converter substrate according to a further embodiment of the invention.
Figure 13:
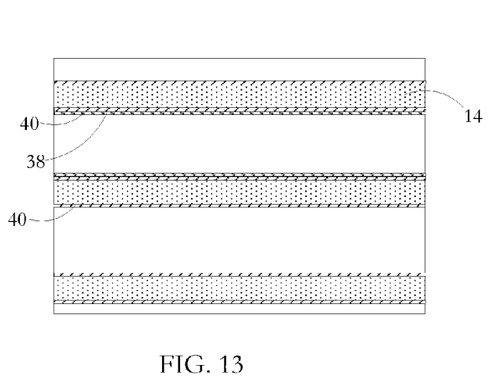
FIG. 13 is a longitudinal sectional view of the substrate fragment illustrated in FIG. 12.

In another embodiment of the invention, the metal elements are not entrained within the material of the ceramic substrate and are not injected or positioned into selected cells. Instead, as shown in the fragmentary section views of FIGS. 12 and 13, a ferrous metal coating 38 is formed on the interior surfaces of walls 14 of selected converter cells before application of the catalyst(s) coating 40. Alternatively, (not shown) the ferrous metal coating is laid down as a common coating with the catalyst metal(s), either by using alloy particles that contain both the ferrous metal and the catalyst metal(s) or by having a wash in which both the ferrous metal particles and the catalyst metal particles are dispersed. In the latter arrangements, there may be some loss of catalyst action arising from the ferrous metal taking some of the catalyst metal sites and so a compromise is necessary.

All metals are responsive to some extent to an induction field, with ferrous metals being the materials most readily heated by such a field. Catalyst materials contained within a wash coat applied to a honeycomb substrate cell interior are typically platinum group metals—platinum, palladium and rhodium. Such materials have a low magnetic permeability of the order of $1 \times 10^{-6}$ (in the case of platinum) and so are influenced only very slightly by an applied induction field. Moreover, catalyst metals are present in very tiny amounts of the order of a gram per converter brick so there is insufficient metal in the catalyst assembly to generate and transfer any noticeable heat to the ceramic substrate in start-up period or idling periods. In contrast, ferrous metals used for the induction heating are present in an amount of the order of 60 to 200 grams per brick and have magnetic permeability of the order of $2.5 \times 10^{-1}$ in the case of iron.

As previously indicated, induction heating is applied in the period before light-off in order to reduce the amount of harmful pollutants which are emitted before the catalyst coatings have reached a temperature at which they start to catalyse reactions in which the pollutants are converted to more benign emissions. Particularly for city driving, engine operation is frequently characterized by bursts of acceleration and braking punctuated by periods of idling. At such times, the temperature of the exhaust gas entering the converter and the walls of the substrate with which the flowing exhaust gas is in contact may start to fall. If the idling and the cooling continue, the temperature of the substrate and the gas fall below that required for the pollutant-reducing catalytic reactions to occur. In such periods, heating of the converter substrate is obtained by switching on the induction heating. At a future point, when the vehicle is no longer idling and the exhaust gas temperature increases past the temperature required for effective catalytic reaction to convert the toxic exhaust gas pollutants to relatively benign products, the induction heating is switched off.

Embodiments of the induction heating invention have been described in the context of ferrous alloys such as steel which are commercially available in common shapes and sizes, and at reasonable cost. Alternative ferromagnetic metals such as cobalt or nickel or their alloys may also be used. The metal used must survive high temperature reached by the catalytic converter and repeated temperature cycling as the metal intrusions move repeatedly from a cold start to operating temperature and back again. Generally, alloying of iron or other ferromagnetic metal gives advantageous mechanical and physical properties such as corrosion/oxidation resistance, high temperature stability, elastic deformation, and formability.

Referring to FIGS. 14 to 17, embodiments of the invention are illustrated which are adapted for electrohydrodynamic (EHD) heat and mass transfer of exhaust gas passing through the passages or cells of a catalytic converter substrate. In the EHD process, free electrons are generated and caused to migrate from a charged upstream emitter to a grounded downstream collector 44. In the course of their migration, electrons collide with molecules in the exhaust gas, transferring momentum to the gas molecules and causing turbulence in the gas flow. This means that there is a lesser tendency for the gas flow through the cells to adopt a laminar flow and/or there is a tendency for a laminar gas flow to depart from laminarity. Both tendencies bring more exhaust gas into contact with the walls of the converter substrate cell walls than would be the case without EHD stimulation. This results in both an increase in heat transfer between the exhaust gas and the walls of the substrate and an increase in the catalytic pollution-reducing reactions owing to increased contact of the exhaust gas with hot catalyst at the interior surfaces of the substrate cell walls.

In operation, in the period between start-up and light-off, the substrate walls are at a lower temperature than the exhaust gas. More heat is transferred from the flowing exhaust gas to the substrate by stimulation of EHD heat transfer stimulation and the substrate temperature increases at a faster rate than would be the case without the EHD heating process. A control circuit includes a first temperature sensor to monitor the temperature of the converter substrate and a second temperature sensor to monitor the temperature of the exhaust gas immediately upstream of the converter. The control circuit includes a comparator for measuring the difference between the exhaust gas and the converter substrate temperatures and a switch controlled by the comparator to switch on EHD voltage to the emitter. Greater speed to light-off is obtained by switching in the EHD heat transfer process to stimulate heat transfer from the exhaust gas during the start-up to light-off period. At a future point, when the substrate is sufficiently hot to cause the pollution reducing catalytic reaction to occur, EHD heat transfer stimulation is switched off.

In addition, during idling periods, the temperature of the exhaust gas entering the converter may start to drop and a situation may arise where the catalytic converter substrate walls are still at an optimal temperature for catalyst reactions, but the gas entering the converter is below a temperature that it is optimal for such reactions. During the idling phases, the converter may remain at or near an optimal operating temperature from the viewpoint of reducing harmful emissions, even as the gas flowing through the converter is cooling down. In such periods, low power heating of the cooling exhaust gas is obtained by switching in the EHD heat transfer process to draw heat for a limited period of time. At a future point, when the vehicle is no longer idling and the exhaust gas temperature increases past the monitored substrate temperature, the EHD heat transfer stimulation can be switched off.

Figure 14:
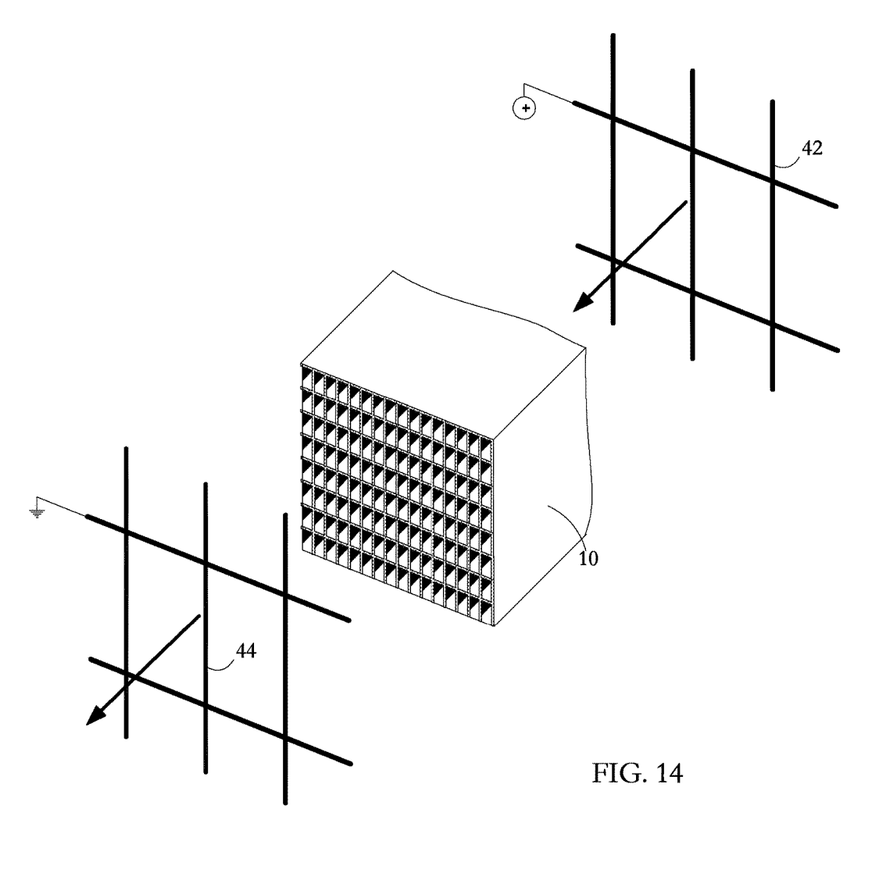
FIG. 14 is a perspective end view of a fragment of a catalytic converter substrate and emitter and collector electrodes illustrating an embodiment of the invention.

Referring in detail to FIG. 14, for operating a catalytic converter in which EHD is implemented, an emitter 42 is connected to a 25 to 50 kilovolts power source delivering very low amperage, the system therefore consuming only a few watts and a collector 44 is grounded. The flow of electrons produces preferential heat exchange between the charged exhaust gas and the converter substrate compared with the passage through the catalytic converter of uncharged exhaust gas. The conductivity of the exhaust gas influences the extent of mixing and flow changes that, in turn, cause more rapid heat transfer between the converter substrate and the exhaust gas. Generally, the more conductive the exhaust gas, the higher the turbulent effect and the greater the EHD heat transfer effect.

As shown in the FIG. 14 embodiment, in a first emitter collector arrangement, the emitter 42 is a regular mesh of 0.25 inch diameter rods and 0.375 inch apertures, the mesh mounted immediately upstream of the converter brick 10. A collector 44 is a similar metal mesh located immediately downstream of the converter brick, this mesh being connected to ground. Interconnection of the upstream mesh to a positive voltage source and interconnection of the downstream mesh to ground provides the positive (emitter) and negative (collector) electrodes required to generate electron flow.

Figure 15:
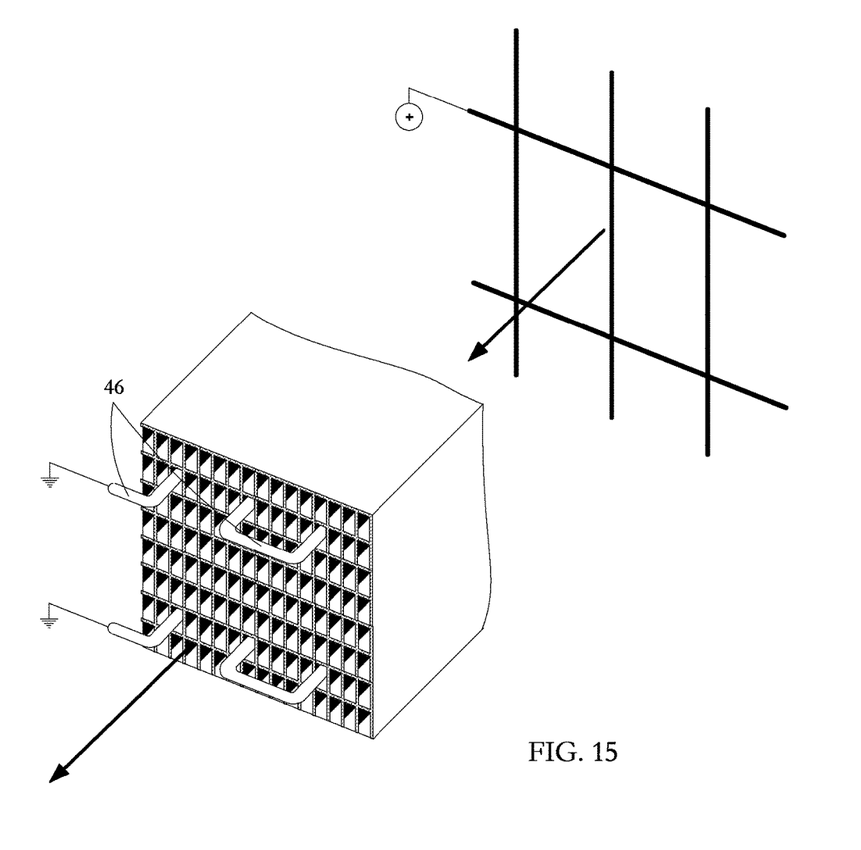
FIG. 15 is a perspective end view of a fragment of a catalytic converter substrate and emitter and collector electrodes illustrating an alternative embodiment of the invention.

As shown in FIG. 15, in a second emitter collector arrangement, a configuration of wire inserts is used similar to that shown in FIG. 8 except that the wire inserts are interconnected to each other and to ground. In the illustrated configuration, a continuous wire 46 is used and is looped in and out of substrate cells so that adjacent wire inserts are effectively stitched into place.

Figure 16:
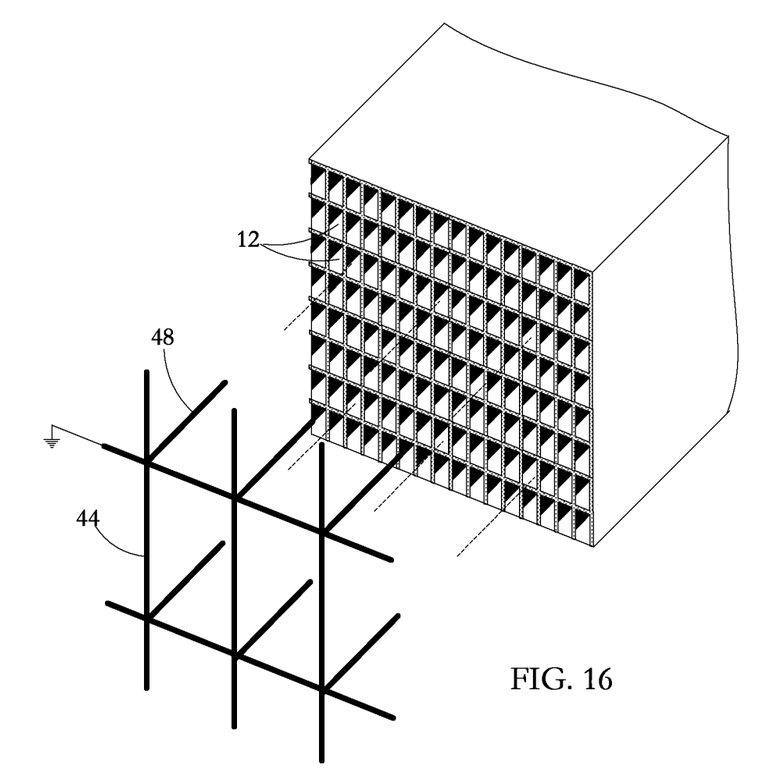
FIG. 16 is a perspective end view of a fragment of a catalytic converter substrate and collector electrode illustrating a further embodiment of the invention.

In another embodiment, as shown in FIG. 16, the mesh collector 44 has protruding wires 48 that are aligned with the longitudinal axis of selected substrate cells. In the course of manufacture, the protruding wires 48 of the mesh collector 44 are slid back towards the front end of the converter brick and into the aligned cells 12. The mesh collector is locked to the back side of the substrate. In one form, the protruding wires 48 have a friction fit within the selected cells 12 as previously described with reference to FIGS. 8 to 11 or are secured in place using a suitable adhesive. In another form and associated method, the protruding wires are pre-located in the selected cells and then bound in place by injecting a metal mastic matrix into the cell and then drying and sintering the matrix.

Figure 17:
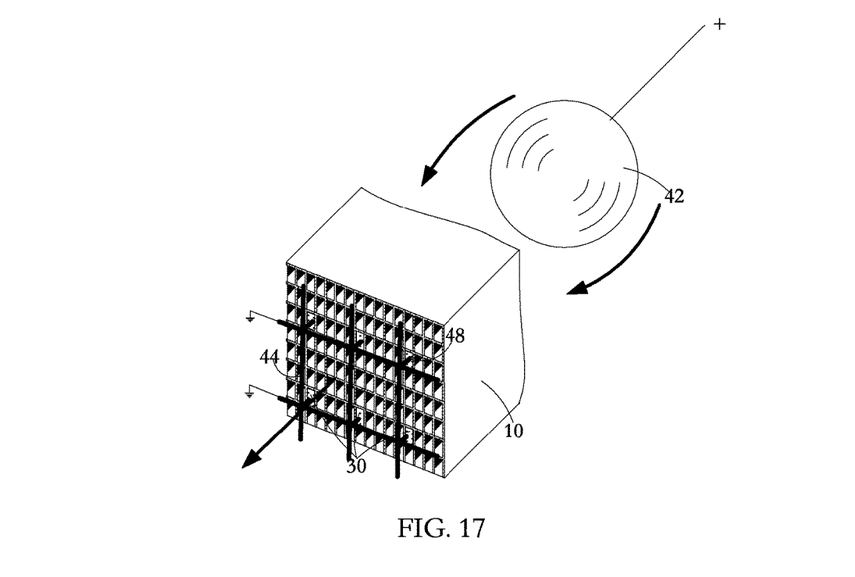
FIG. 17 is a perspective end view of fragments of a catalytic converter substrate and emitter electrode and, to a larger scale, a collector electrode, illustrating another embodiment of the invention.

In a further emitter collector arrangement as shown in FIG. 17, the emitter 42 is a metal sphere having a diameter matching the diameter of a cylindrical converter substrate, the sphere being devoid of angular corners so that electron emission is relatively evenly distributed across its surface. A series of collectors are formed by filling selected converter cells 12 with a metal powder in a binder matrix to constitute a series of collector sites 30, the collector thread within the plugged cells being connected together and to ground by, for example, a mesh of the form shown in FIG. 16 but with relatively shorter contact projections 48. The metal particles are mixed with a mastic and the resulting mixture is injected using a method such as that described in copending utility patent application 13971129 (A catalytic converter assembly and process for its manufacture), filed Aug. 20, 2013, the disclosure of which application is incorporated herein by reference in its entirety and made part of the present application for all purposes. Following injection, injected threads 30 of the mastic mixture are cured by, for example, microwave heating as described in copending utility patent application 13971247 (A catalytic converter assembly and process for its manufacture) filed Aug. 20, 2013, the disclosure of which application is also incorporated herein by reference in its entirety and made part of the present application for all purposes. In one implementation, the mastic base material is a low viscosity, paste-like mixture of glass fibers, clay slurry, polymer binder and water, from which the water and the organic binder are driven off in the course of the curing process. Following curing, the injected threads 30 are predominantly silica in a porous matrix of silica, ceramic and metal particles.

In a modification (not shown) of the FIG. 17 embodiment, a uniformly distributed first selection of cells is blocked with the metal binder matrix, the cells being wired together and to each other to form emitters. An equal number of cells generally alternating in distribution with the emitter cells are also blocked with metal binder matrix, the second set of cells being wired together and to ground to form collectors. This arrangement has high efficiency at the surface of substrate cells because the emitter and collector are integral parts of the substrate.

In further alternatives, the emitter and collector configurations shown previously can be matched differently.

A benefit of induction heating is that converter assemblies can be smaller. A cold start produces 75 to 90% of the pollutants of an internal combustion engine and this drives the size of the overall exhaust assemblies. Since the induction heating technology addresses much of this 75 to 90%, there is the ability to shrink the converter package. By introducing added heat and mass transfer with the implementation of an EHD sub-system, further size reduction is possible.

National emissions standard requirements are a prime driver for catalytic converter design. The requirements are very high and difficult to meet by with a single converter. Currently, therefore, most cars now in production employ a two converter assembly—one at a close-coupled position and the other at an underfloor position. The close-coupled converter is normally lighter in weight than the underfloor converter which means that is has low thermal capacity and so will attain a catalytic reaction operating temperature as quickly as possible. However, the close-coupled converter is of relatively lower efficiency compared with the heavier underfloor converter once the two converters have reached their respective catalytic reaction operating temperatures. By introducing induction heating to the exhaust process at start-up, it may be manufacturers can return to a single converter installation and meet emission standards by eliminating the need for the close-coupled converter.

Although embodiments of the invention have been described in the context of ceramic catalytic converter substrates, stainless substrate substrates can also be used, with induction heating being implemented in a similar way to that described above. Substrates made of 400 series magnetic alloys are preferred because such alloys exhibit significant magnetic hysteresis. With a surrounding coil, the outer annular regions of small diameter stainless steel substrates heat up extremely quickly owing to their small thermal capacity.

In the case of EHD heat and mass transfer, in an alternative embodiment of the invention using a stainless steel substrate, the catalytic converter has two steel bricks with the first functioning as an emitter and the second as a collector. In such cases, insertion of wire inserts or injection and curing of metal mastic threads are obviated because the steel bricks themselves function to emit and collect the free electrons.

Embodiments of the EHD heat and mass transfer invention have been described in the context of ferrous alloys such as steel which are commercially available in common shapes and sizes, and at reasonable cost. Alternative metals may be used for the EHD electrodes provided that they can survive high temperature reached in the catalytic converter and repeated temperature cycling as the metal elements in the converter substrate body move repeatedly from a cold start to operating temperature and back again. Generally, alloying gives advantageous mechanical and physical properties such as corrosion/oxidation resistance, high temperature stability, elastic deformation, and formability.

In applying the induction heating and EHD mass and heat transfer inventions to the structure and operation of a catalytic converter, the electrical circuit and electrical inputs required to implement induction heating are different from the are electrical circuit and electrical inputs required to implement EHD heat and mass transfer. In this respect, it is likely that the EHD effect is influenced by the applied induction field. This could be a positive influence with the induction field adding a zigzag component to the electron flow resulting in enhanced heat and mass transfer. Alternatively, the induction field may eclipse the EHD effect.

Figure 18:
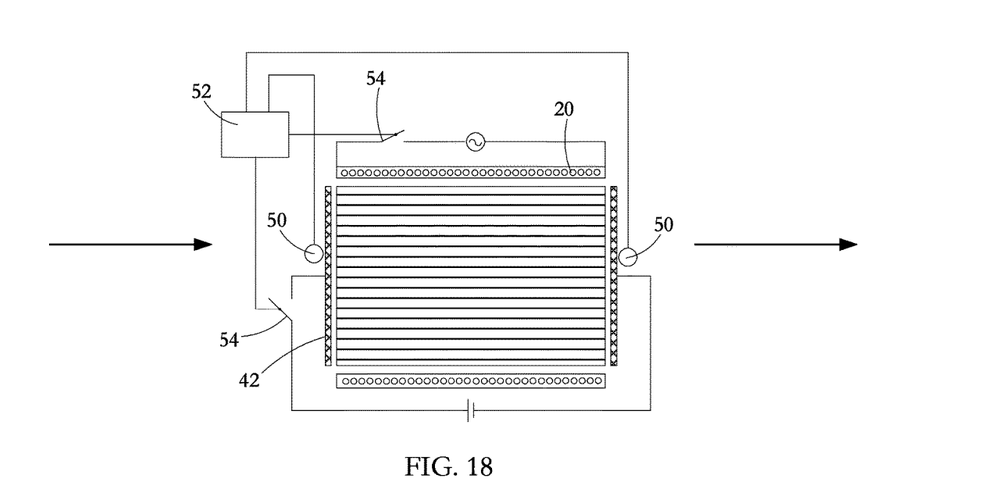
FIG. 18 is a schematic view of a control system according to an embodiment of the invention.

The induction heating process and the EHD mass and heat transfer process may be applied simultaneously or at separate times during, or in the case of induction heating, immediately before start-up. As shown in the schematic view of FIG. 18, one or more temperature sensors 50 mounted in the catalytic converter are used to monitor temperature at any time and can be suitably deployed to monitor temperature at different locations in the converter. Outputs from the temperature sensors are taken to a controller 52 at which the monitored temperature or temperatures are used to control through switches 54 the times at which the induction and EHD processes are used. Using an appropriate algorithm implemented at the controller 52, the monitored temperatures may also be used to control specific effects of the applied induction and EHD processes in implementations where the induction field characteristics or the EHD high voltage characteristics are selectable to achieve a particular induction heating pattern or EHD effect.

What is claimed is:

1. An assembly for treating gaseous emissions comprising a honeycomb ceramic substrate body having a plurality of cells, a first set of the plurality of cells for the passage of emissions gas, discrete lengths of metal wire located in respective ones of each of a second set of the plurality of cells, and an induction heating coil mounted adjacent the substrate body for generating a varying electromagnetic field, to thereby inductively heat the discrete lengths of wire and to thereby heat the substrate body and the emissions gas.

2. The assembly as claimed in claim 1, wherein at least some of the discrete lengths of metal wire are held in the respective cells of the second set thereof by a bonding material to bond the metal wire lengths to the interior surfaces of the respective cells.

3. The assembly as claimed in claim 1, wherein at least some of the discrete lengths of metal wire are held in the respective cells of the second set thereof by a friction fit.

4. The assembly as claimed in claim 3, at least one of the discrete lengths of metal wire formed with a non-linear element, at least a part of the non-linear element bearing against bounding surfaces of the respective cells of the second set thereof.

5. The assembly as claimed in claim 1, the metal being a ferromagnetic metal.

6. The assembly as claimed in claim 1, further comprising a layer of material immediately outside the coil for limiting electromagnetic field radiated outside the assembly when the varying electromagnetic field is generated at the coil.

7. The assembly as claimed in claim 1, further comprising a layer of material immediately outside the coil for increasing inductive coupling between the coil and the discrete lengths of metal wire when the varying electromagnetic field is generated at the coil.

8. The assembly as claimed in claim 1, the cells bounded by walls of the honeycomb ceramic substrate body, the walls coated with catalyst-containing material for promoting a pollution-reducing chemical reaction.

9. The assembly as claimed in claim 1, at least one of the discrete lengths of metal wire being one of round, square, hexagonal and triangular cross-section.

10. The assembly as claimed in claim 1, the cells of said plurality thereof in a regular array and having a cell density across the substrate body of from 400 to 900 cells per square inch.

11. The assembly as claimed in claim 1, further comprising a temperature sensor mounted at the substrate body and connected into a circuit for providing feedback to a control system for controlling an engine operable to generate the gaseous emissions to be treated.

12. A process for treating gaseous emissions comprising passing the gaseous emissions through a first set of a plurality of cells in a honeycomb ceramic substrate body, and generating a varying electromagnetic field in an induction heating coil mounted adjacent the honeycomb ceramic substrate body to thereby inductively heat discrete lengths of metal wire located in respective ones of a second set of the plurality of cells, thereby to heat the ceramic substrate body and the passing gaseous emissions.

13. The process as claimed in claim 12, wherein at least one of the discrete lengths of wire is held in a respective cell of the second set thereof by a bonding material to bond said discrete length of metal wire to the interior surface of the cell.

14. The process as claimed in claim 12, wherein at least one of the discrete lengths of metal wire is held in a respective cell of the second set thereof by a friction fit.

15. The process as claimed in claim 12, further comprising generating the varying electromagnetic field when an engine operable to generate the gaseous emissions to be treated is operating and when the ceramic substrate body is below a predetermined threshold temperature.

16. The process as claimed in claim 12, further comprising generating the varying electromagnetic field for a period before start-up of an engine operable to generate the gaseous emissions to be treated.

* * * * *